July 30, 1968     T. W. GAVIN     3,394,931
STOCK GRIPPER
Filed Jan. 4, 1966     2 Sheets-Sheet 1
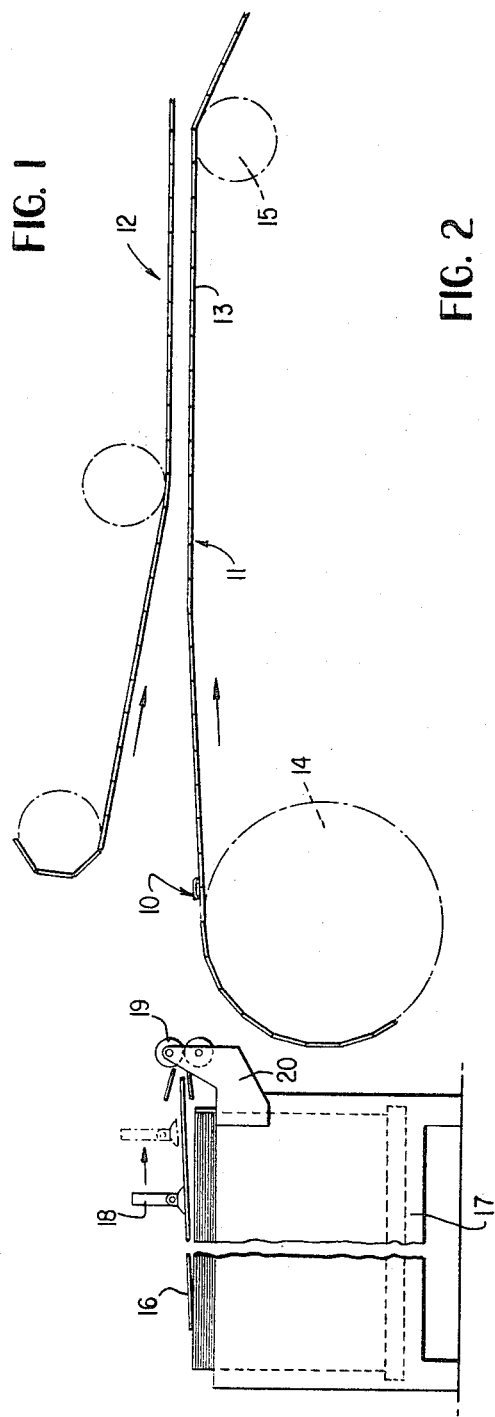
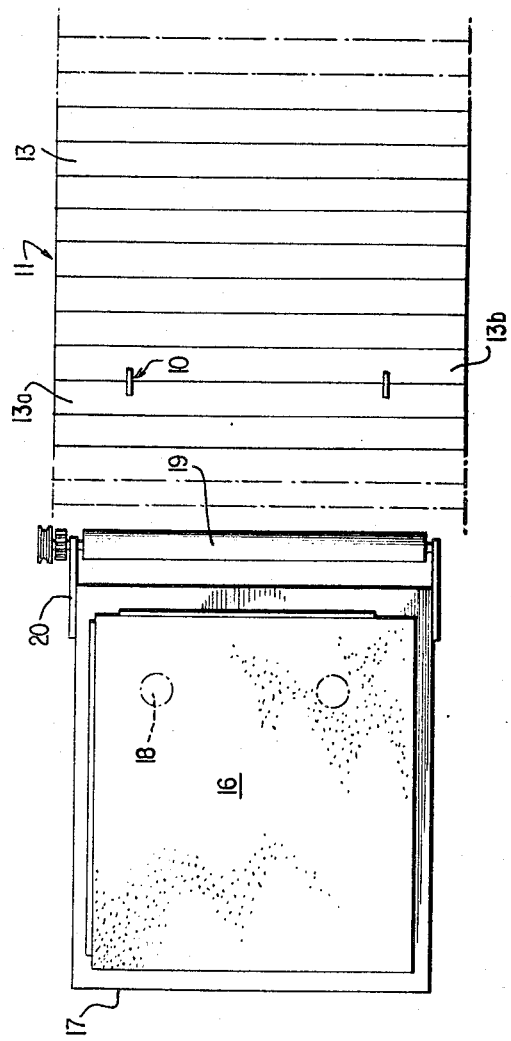
INVENTOR
THOMAS W. GAVIN
BY *Dennison & Dennison*
ATTORNEYS.

July 30, 1968    T. W. GAVIN    3,394,931
STOCK GRIPPER

Filed Jan. 4, 1966    2 Sheets-Sheet 2

INVENTOR
THOMAS W. GAVIN
BY *Dennison & Dennison*
ATTORNEYS

United States Patent Office 3,394,931
Patented July 30, 1968

3,394,931
STOCK GRIPPER
Thomas W. Gavin, 3695 Orchard Road,
Wantagh, N.Y. 11793
Filed Jan. 4, 1966, Ser. No. 518,598
7 Claims. (Cl. 271—45)

ABSTRACT OF THE DISCLOSURE

A stock gripper for attachment to an endless conveyor including an arm pivoted at one end to the conveyor and having a head depending from the free end thereof, the head having a curved rear face and a vertical front face. A resilient piston is mounted on the conveyor upon which said head normally rests spaced above the conveyor. Stock forced against said piston releases the head allowing the pivot arm to fall with the head gripping the material to the conveyor, the piston then abutting against the vertical front face of the head. Automatic release means are provided to release the piston to its normal position during change in planar movement of the conveyor.

---

The present invention relates to new and useful improvements in stock grippers and more particularly to a gripper construction adapted for attachment to an endless belt or rotary conveyor type of machine designed for carrying sheet or web material through a mechanical operation such as printing or die cutting.

With the advent of repetitive cycle rotary printing and die cutting equipment, and other prior art equipment in the field wherein material must be temporarily secured to a traveling belt or band or slats attached to a chain, it is necessary to provide mechanical means for securely attaching the material to be worked to the travelling belt or conveying means. Many of the devices heretofore proposed have been exceedingly complicated in design and have required various types of actuating means such as cams, rack and pinion mechanisms, and the like. With the high speeds now reached by such existing equipment, it is necessary that the mass of such gripper units be kept to a minimum. Insofar as maintenance is concerned, it is essential that the number of moving parts in such devices be kept to a minimum.

The stock gripper of the present invention has wide utility although it has been specifically designed for use with repetitive cycle rotary impression machines of the type shown and described in Patent No. 3,192,856, issued July 6, 1965 to Thomas W. Gavin. In machines of this type, a lower endless belt is frequently provided to co-act with the upper run or chain shown in FIGURE 1 of the aforementioned patent. The stock gripper of the instant invention is designed to be applied to the slats of the lower run.

In the prior art devices, there are few workable structures which will automatically release the gripping pressure at a pre-set location in the machine cycle. The instant application overcomes this problem and provides a positive automatic release for the gripper.

The stock gripper of this invention obviates all of the known defects previously associated with such devices and further results in considerable savings of time and expense to the machine operator since the gripper is automatically actuating and can be operated with any conventional automatic or manual feed and is sensitive in its operation on either light or heavy stock.

It is an object of the present invention to provide a stock gripper for use on endless conveyors which is automatically actuated by initial contact of the leading edge of the stock material to be fed.

It is a further object of this invention to provide a stock gripper that will automatically release the stock at a pre-determined location in the path of the belt or travelling member to which the gripper is attached.

A still further object of this invention is to provide a stock gripper structure which will automatically release the stock material when the gripper passes about a circular path of travel.

Another object of this invention is to provide a stock gripper adapted for use on an endless conveyor formed from a plurality of slats having a base portion attached to one slat and a gripping portion co-acting with the slat immediately therefollowing.

Another object of the present invention is to provide a gripping device for stock material having a gripper arm which is normally positively held spaced away from the stock material and which will automatically grip the material when it is placed in contact with a piston associated with the gripper.

Other objects of the invention are to provide a stock gripper, bearing the above objects in mind, which is of durable construction, contains a minimum number of working parts, is light in weight, and is at all times safe and efficient in use.

For other objects and for a better understanding of the invention, reference may be had to the following detailed description, taken in conjunction with the accompanying drawings in which:

FIGURE 1 is a schematic illustration of a side elevation of a rotary impression machine incorporating upper and lower runs and showing a feed table in conjunction therewith;

FIGURE 2 is an enlarged plan view of the feed table and the leading portion of the lower run of the machine shown in FIGURE 1;

Reference is now made more specifically to the drawings wherein like numerals designate similar parts throughout the several views and wherein the stock gripper of the present invention is designated generally at 10.

Figure 3:
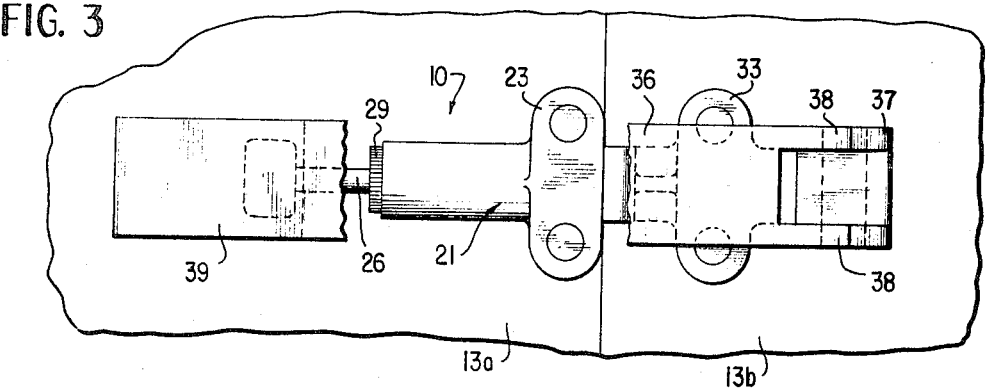
FIGURE 3 is a plan view of a stock gripper having the forward portion of the gripper arm broken away to show the details therebelow.

The stock grippers are preferably applied to the lower run 11 of a rotary machine indicated generally at 12. The lower run incorporates a plurality of slat members 13 interconnected in a manner more clearly shown in U.S. Patent No. 3,192,856. These slats pass about a drive sprocket wheel 14 and one or more guide rolls 15. Portions of the stock gripper are attached to successive slats 13a and 13b as more clearly shown in FIGURES 3 through 6.

The stock material to be fed into this machine generally comprises rather thick corrugated material, although thinner sheets of paper and the like could well be used. Various devices may be employed to initially feed the sheets of material or endless stock to the stock gripper and only one such mechanical device is shown in FIGURES 1 and 2. A plurality of sheets 16 of stock material are placed in a pile on a feed table 17. Means within the table structure (not shown) may be provided to successively urge the stack upwardly as sheets are fed therefrom. Mechanically actuated suction cups 18 are operated to move the top sheet 16 between a pair of feed rollers 19 mounted by means of a bracket 20 to the table. These feed rolls may be driven off of the primary rotary die cutting machine motor. It is to be understood that various types of feed devices could well be employed such as the conventional kicker which reciprocates and pushes out the bottom sheet of the pile of a thick stock material.

Figure 4:
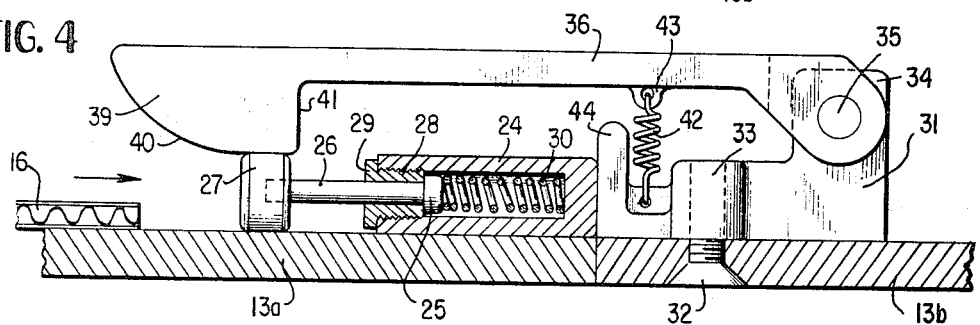
FIGURE 4 is a side elevation of the stock gripper shown in FIGURE 3 with the cylinder portion being shown in section and showing the relationship of the parts prior to the stock material being placed in contact therewith.
Figure 5:
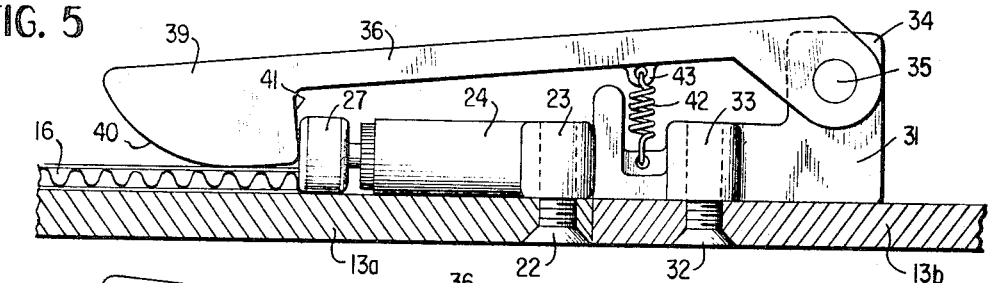
FIGURE 5 is a side elevation similar to FIGURE 4, but showing the stock material after it has been gripped in the device.

The assembly of the stock gripper itself is shown in detail in FIGURES 3 through 6 and reference is made thereto. A piston and cylinder assembly 21 is secured to panel 13a by any conventional means such as a pair of fasteners 22 passed through the slat and apertures formed in the attaching ear 23 of the piston-cylinder assembly. The piston-cylinder assembly includes a cylinder 24 adapted to receive the piston head 25 which is secured to the piston shaft 26. An actuating head 27 of larger diameter than the shaft 26 is secured to the free end of the piston shaft. A guide bushing 28 is threadedly received in the open end of cylinder 24 and has an annular collar 29 which engages the outer face of the cylinder 24. Bushing 28 snugly receives the reciprocating piston shaft 26 and retains the same for horizontal reciprocating movement without any noticeable deflection. A coil spring 30 is placed within cylinder 24 and serves to urge the piston 25 outwardly as shown in FIGURE 4. Other types of spring devices and resilient means may be employed instead of the coil spring which is shown by way of example.

The remaining components of the stock gripper are mounted on slat 13b, which slat is the forwardmost of the two slats involved in the mounting of the stock gripper. Gripper arm mounting bracket 31 is secured to slat 13b in any manner similar to the method of securing the piston-cylinder assembly 21 to the slat 13a, and fastener means 32 passing through the slat and through the ears 33 on the mounting bracket are employed. Mounting bracket 31 includes an upwardly disposed extension 34 having an opening therein to receive pivot pin 35.

The rearward end of the mounting bracket 31 includes an upwardly extending finger 44 whose function and operation are described later herein.

The gripper arm 36 is formed with a bifurcated forward end including ears 37 and 38 each having aligned openings therein. The ears are adapted to straddle the extension 34 with the pivot pin 35 passing therethrough to mount the gripper arm for pivotal movement.

The rearward end of the gripper arm is provided with an enlarged grip head 39 incorporating an arcuate or curved face 40 and a generally straight lock face 41. A tension spring 42 is attached to a depending ear 43 formed near the forward end of the gripper arm, but rearward of its pivot point. The other end of this spring is secured to the mounting bracket 31.

In operation, the components of the stock gripper initially assume the positions shown in FIGURE 4 wherein the piston 25 is in its outward extreme position under the bias of spring 30 and wherein the arcuate face 40 of grip head 39 is in engagement with the actuating head 27 of the piston due to the downward bias of the spring 42 and the normal weight of the gripper arm. As the slats are moving in a forward direction, a sheet of stock material 16 is moved in the same direction but at a somewhat higher speed so that its leading end will engage the actuating head 27. Further forward movement of the stock with respect to the slats 16 will cause reciprocation of the piston shaft 26 in a forward direction compressing the spring 30 and causing the actuating head 27 to be moved past the lock face 41 which will permit the gripper arm 36 to fall until the stock material is gripped against the slat 13a by the head 39 of the gripper arm. The spring 42 also assists in causing immediate downward movement of the head 39 as the actuating head 27 is moved clear of engagement with grip head 39. Spring 30 then causes the piston head 25 and its associated shaft 26 to be urged outwardly causing actuating head 27 to tightly engage against the vertical lock face 41 of the gripper arm head 39. This is clearly shown in FIGURE 5, wherein the piston is held from further outward movement by the face 41 of the gripper arm.

Under these conditions of operation, the stock material 16 will be tightly and securely gripped to its associated slat and can be moved through the various stations of the machine where printing, die cutting, etc. may be performed in the conventional manner.

Figure 6:
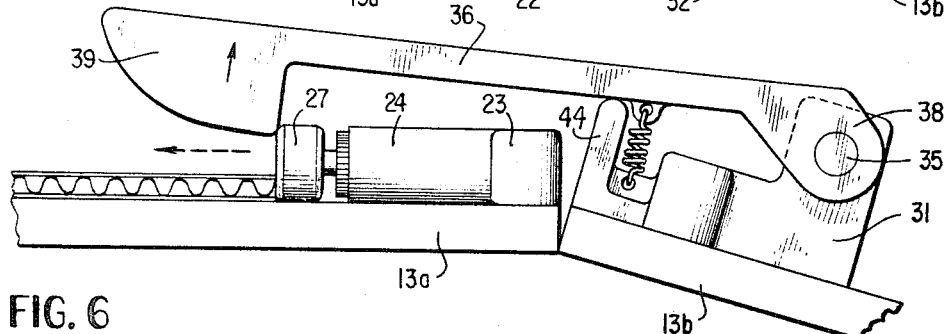
FIGURE 6 is a further side elevation showing the relationship of the parts as the slats are passing about a sprocket wheel and showing the manner in which the gripper device is automatically disengaged from the stock material.

As the slats approach a guide roller 15, and initially pass thereabout, the forward slat 13b will move downwardly with respect to the rearward slat 13a as shown best in FIGURE 6. As this movement occurs, the pin 44 will abut against the lower face of the gripper arm 36 and as slat movement about roller 15 continues the pin 44 will gradually force the gripper arm upwardly in the direction of the arrow in FIGURE 6. This upward movement will continue until the vertical lock face 41 of the gripper arm head 39 moves clear of the actuating head 37 which is being biased outwardly by the spring 30. At such time, the piston will move outwardly giving a positive expelling push to the stock material 16 and disengaging it from the gripper. As the slats again approach a horizontal attitude, the components will again assume the position shown in FIGURE 4, wherein they are ready to receive another sheet of stock material.

It will be appreciated that the stock gripper of the instant invention can be used in any numbers and could well be applied to many types of conveyor systems and is not limited to use on conveyor devices incorporating a plurality of slats. For example, the gripper mounting bracket 31 could well be attached to a flexible conveyor belt or the like.

It is also contemplated that the gripper could be used with relatively thin material that is weak in compression, such as thin paper or the like. When used with such material, it will be necessary, however, to provide some mechanical means for causing the actuating head 27 to reciprocate. Mechanical fingers or the like can be provided in such instances.

While I have shown and described a preferred embodiment of the present invention, it is to be understood that the drawings and detailed disclosure are to be construed in an illustrative, rather than a limiting sense, since various modifications and substitutions of equivalents may be made by those skilled in the art within the spirit and scope of the invention as defined in the appended claims.

What I claim as my invention and desire to protect by Letters Patent of the United States is:

1. A stock gripper for releasably securing stock material to a conveyor which is adapted to travel in a flexible manner and has both planar and circular portions of travel, said gripper comprising a bracket mounted on said conveyor and having a forward upstanding portion, an elongated gripper arm pivotally mounted for vertical movement on said upstanding portion and extending rearwardly of said bracket, an upstanding finger on the rearward end of said bracket underlying an intermediate portion of said gripper arm, a depending head on the free end of said gripper arm adapted to engage and secure stock material against said conveyor, said head having a rearward curved face, a bottom planar horizontal face, and a forward generally vertical face, a horizontally disposed cylinder secured to said conveyor rearwardly of said bracket and forwardly of said depending head, a piston reciprocable within said cylinder, bushing means at the rear end of said cylinder limiting rearward movement of said piston, first resilient means normally urging said piston rearwardly, an actuating head secured to said rearward end of said piston, said horizontal face of said depending head normally resting on said actuating head whereby it is spaced from said conveyor, and second resilient means normally urging said gripper arm toward said conveyor, whereby movement of stock material against the rearward face of said actuating head will displace said actuating head and associated piston against said first resilient means until said actuating head is moved past said forward vertical face causing said depending head to engage said stock material against said conveyor during the planar portion of conveyor travel, transition of the conveyor portion on which said bracket is mounted to circular travel causing said upstanding finger to engage the intermediate portion of said gripper arm raising the same and its associated depending head until the bottom of the vertical face thereof is clear of said actuating head releasing said stock material and said actuating head which will return to its rearward position under the bias of the first resilient means.

2. A stock gripper as set forth in claim 1, wherein said conveyor is formed of a plurality of adjacent interconnected slats running transverse to the direction of conveyor movement and wherein said bracket and cylinder are mounted on adjacent slats.

3. A stock gripper for releasably securing stock material to a travelling conveyor, said gripper comprising a gripper arm mounted on said conveyor for vertical pivotal movement, said arm having head means adapted to tightly secure said stock material to said conveyor, actuating means including a cylinder mounted parallel to and on said conveyor, said cylinder having a piston reciprocable therein, resilient means normally biasing said piston outwardly of the cylinder, means limiting outward movement of said piston, a piston shaft extending outwardly of said cylinder, an actuating head on the free end of said shaft, head means normally resting on and spaced from said conveyor by said actuating head to receive stock material therebetween and adapted when engaged by external means to release said head to secure said material against said conveyor, movement of said external means against the outward face of said actuating head displacing the same against said resilient means allowing said head means to move into contact with said stock material, and automatic release means operable to release said head means from stock engagement during non-planar movement of the portion of the conveyor upon which the gripper is mounted.

4. A stock gripper as set forth in claim 3 and further including resilient means acting on said gripper arm urging said head means toward said conveyor.

5. A stock gripper as set forth in claim 3, wherein said head means comprises an extension depending from said gripper arm, said extension having a generally curved rear face adapted to engage against said external means, a planar bottom face tangential to said rear face and adapted to rest upon said actuating head, and a vertical front lock face against which said actuating head acts when said head means is in securing engagement with said stock material.

6. A stock gripper for releasably securing stock material to a travelling conveyor, said gripper comprising a gripper arm mounted on said conveyor for vertical pivotal movement, said arm having head means adapted to tightly secure said stock material to said conveyor, actuating means secured on said conveyor normally retaining said head means spaced from said conveyor to receive stock material therebetween and adapted when engaged by external means to release said head means to secure said material to said conveyor, and automatic release means for releasing said head means from stock engagement comprising a bracket mounted on said conveyor, an upstanding extension on the forward portion of the bracket, said gripper arm being pivotally mounted on said extension and extending rearwardly of said bracket, an upstanding finger on said bracket rearward of said extension and underlying an intermediate portion of said gripper arm, whereby a change in the planar direction of travel of the portion of the conveyor upon which said bracket is mounted will cause the intermediate portion of said gripper arm to contact said upstanding finger limiting pivotal movement of said arm and causing it to change its planar direction of travel thereby releasing said head means from its gripping engagement with the stock material.

7. A stock gripper as defined in claim 6, wherein the forward end of said gripper arm is bifurcated and receives said upstanding extension of said bracket.

References Cited

UNITED STATES PATENTS

| | | | |
|---|---|---|---|
| 645,016 | 3/1900 | Rose | 198—179 |
| 1,093,152 | 4/1914 | Wright | 198—179 |

RICHARD E. AEGERTER, *Primary Examiner.*